United States Patent [19]
Miller et al.

[11] 3,935,558
[45] Jan. 27, 1976

[54] SURGE DETECTOR FOR TURBINE ENGINES

[75] Inventors: Ronald J. Miller, North Palm Beach; Thomas M. Randolph, Palm Springs, both of Fla.

[73] Assignee: United Technologies Corporation, Hartford, Conn.

[22] Filed: Dec. 11, 1974

[21] Appl. No.: 531,636

[52] U.S. Cl. ................ 340/27 SS; 73/115; 73/116; 60/223; 60/226 R; 60/39.28 R
[51] Int. Cl.² .................... G01M 15/00; F02C 9/02
[58] Field of Search .......... 60/39.28 R, 223, 226 R; 73/115, 116; 415/1, 26–29; 340/27 SS, 27 R

[56] References Cited
UNITED STATES PATENTS

| | | | |
|---|---|---|---|
| 3,267,669 | 8/1966 | Tissier | 60/39.28 R |
| 3,392,739 | 7/1968 | Taplin et al. | 60/39.28 R |
| 3,671,134 | 6/1972 | Boothe | 60/39.28 R |
| 3,677,000 | 7/1972 | Thomson | 60/39.28 R |
| 3,868,625 | 2/1975 | Speigner et al. | 73/115 |

Primary Examiner—C. J. Husar
Assistant Examiner—Robert E. Garrett
Attorney, Agent, or Firm—Donald F. Bradley

[57] ABSTRACT

A pair of pressure transducers are connected to pressure probes positioned in a flow passage of a turbofan engine downstream of the fan and respond to pressure fluctuations which occur in the airstream. One transducer has a high response capability, and its output is passed through a band-pass filter to isolate the high frequencies of interest. The other transducer has a low response capability, and its output is passed through a low-pass filter to provide the steady state pressure level. A triggering level is scheduled as a function of the steady state pressure level, and a comparator is used to continuously compare the triggering level with the level of the high frequency pressure signal produced in the band-pass filter. If the amplitude of the high frequency pressure is greater than that of the triggering level, the engine is approaching a surge or stall condition, and a warning signal is generated which may be used to institute corrective action.

10 Claims, 2 Drawing Figures

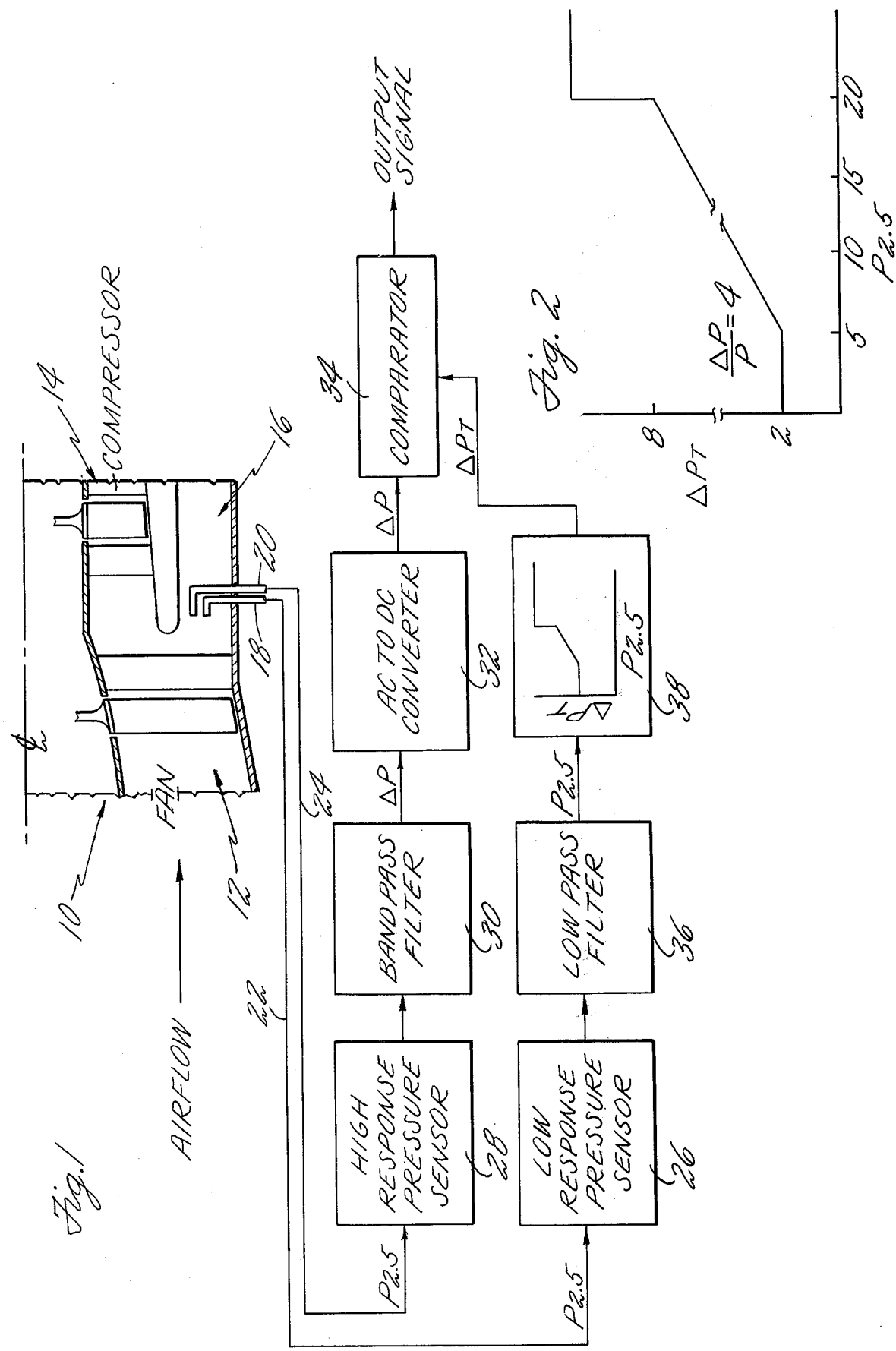

SURGE DETECTOR FOR TURBINE ENGINES

BACKGROUND OF THE INVENTION

1. Field of the Invention

This invention relates to turbine engines, and particularly to a method and apparatus for sensing when the engine is operating near a surge or stall condition. The present invention senses the imminence of off idle stall and fan surge in the fan or compressor portion of the engine prior to a complete engine airflow breakdown. By anticipating or sensing the onset of surge, corrective action can be taken to avoid the actual stall or surge condition thereby prolonging engine life, preventing severely degraded engine performance and adding to the operational safety margin of aircraft utilizing turbine engines. Superior performance can also be realized from a turbine engine which, because of the protection afforded by the method and apparatus of this invention, may be operated at minimum surge margin.

The method and apparatus of this invention may also be applied advantageously to nonflight turbine engines and/or fan and compressor rig testing during which intentional surges must be induced to define and document the surge line. By identifying the point of surge imminence, yet avoiding the mechanical and/or aerodynamic loading imposed by the surge condition, much more data and longer hardware life can be realized.

2. Description of the Prior Art

The present invention is an improvement over the near surge indicator for turbine engines which is described and claimed in U.S. patent application Ser. No. 400,307 and entitled "Near Surge Indicator for Turbine Engines" filed Sept. 24, 1973, now U.S. Pat. No. 3,868,625, and assigned to the same assignee as the present application. In the prior application a pair of pressure sensitive transducers are connected to pressure probes positioned in an engine flow path such as the fan discharge path of a turbofan engine. One of the pressure transducers is a high response device sensitive to a frequency range such as 0 to 1,000 Hz. The output from the high response transducer is passed through a band-pass filter to isolate the frequencies of interest, approximately 10 to 250 Hz, and to attenuate the pressure oscillation frequencies outside this range. The other of the transducers is a low response device which responds only to low pressure frequencies. The output from the low response transducer is passed through a low-pass filter to attenuate all frequencies above about one-fourth Hz and pass therethrough only low frequencies equivalent to the steady state absolute pressure level. The ratio of the amplitudes of the high frequency pressure oscillations to the steady state signal is electronically computed in a ratio calculator and this ratio is continuously compared with a predetermined reference ratio in a comparator circuit. If the computed ratio is higher than the reference ratio, the imminence or existence of surge condition is signalled and corrective action may be taken or a warning signal may be produced.

The actual onset of surge may also be sensed as described in the above-identified patent application by passing through the high response transducer frequencies in the 10–90 Hz range and modifying the predetermined ratio accordingly.

The present invention is an improvement on the teachings of the above-identified patent application and utilizes the same basic principle that off idle stall and fan surge are preceded by an increase in high frequency pressure fluctuations in the airstream behind the fan. In the prior application the high frequency pressure fluctuations show a distinctive signature which can be used to warn of incipient surge and to automatically activate surge avoidance procedures.

In present-day turbine engines, the pressure levels that must be sensed range from 3 to 100 psi. It has been found that for best results with the near surge indicator described in the above-identified application, the useful signal range is from 3 to 20 psi. Typical pressure sensors presently available have an accuracy capability of plus or minus 2 percent of full scale so that even at the highest pressures which occur in the engine, the pressure can be sensed only to an accuracy of plus or minus 2 psi. At very high altitudes, the pressure can be as low as 3 psi, and in this case the accuracy of the output from the pressure sensors is relatively poor. Furthermore, the apparatus described in the prior application requires the computation of a ratio of the amplitudes of the high frequency pressure oscillations to the steady state pressure, and the accuracy of this ratio computation is severely decreased at low pressures.

SUMMARY OF THE INVENTION

The present invention overcomes the limitations of the prior art by removing the signal ratio calculation and producing in place thereof a trigger level as a function of the steady state pressure. The high frequency pressure fluctuations are compared with the trigger level, and high frequency pressure fluctuations which exceed the trigger level are indicative of the imminence of off idle stall or fan surge. This improvement allows more reliable operation at the low pressure levels associated with high altitude and part power conditions.

In accordance with a preferred embodiment of the present invention, a pair of pressure transducers are connected to pressure probes positioned in a flow passage of a turbofan engine downstream of the fan and respond to the pressure fluctuations which occur in the airstream. One transducer has a high response capability, and its output is passed through a band-pass filter to isolate the high frequencies of interest. The other transducer has a low response capability, and its output is passed through a low-pass filter to provide a steady state pressure level. The steady state pressure level is used to schedule a triggering level which is then compared with the high frequency signal produced in the band-pass filter. If the amplitude of the high frequency pressure signal is greater than that of the triggering level, the engine is approaching a surge or stall condition, and a warning signal may be generated which can act as an alarm, or which may be used to institute corrective action.

BRIEF DESCRIPTION OF THE DRAWINGS

FIG. 1 is a schematic of a turbofan engine showing the installation of pressure sensitive transducers and their connection to the improved near surge indicating system.

FIG. 2 is a graph showing the triggering level generated in FIG. 1 as a function of steady state pressure.

DESCRIPTION OF THE PREFERRED EMBODIMENT

In FIG. 1 there is shown in schematic form a portion of a typical axial flow turbofan engine 10. In turbofan engines, air is passed through the engine inlet into the fan stage 12 where the air is compressed by means of rotating fan blades and fixed stators. More than one fan stage 12 may be provided. A portion of the fan air is then passed into a multistage compressor 14 where further compression of the air takes place, this air being combusted and passed through turbines which drive the fan and compressor stages, and ultimately being passed through a nozzle resulting in forward propulsive thrust from the engine. Another portion of the compressed fan air is fed into a bypass duct 16 to create additional thrust from the engine, the fan air being exhausted separately or being remixed with the main airstream and then being exhausted through the nozzle.

A pair of pressure sensitive transducers are connected to pressure probes located so as to measure the pressure in the fan discharge flow path and to respond to both the variations in amplitude and frequency of the pressure of the air which passes through the fan stage 12. In FIG. 1 the pressure transducers are shown as pressure probes 18 and 20 connected respectively through pneumatic lines 22 and 24 to blocks labeled low response pressure sensor 26 and high response pressure sensor 28. Although schematically shown as located in the fan bypass duct 16, the pressure probes 18 and 20 may be positioned at any convenient location in the path of the fan discharge. The location of the pressure probes between the fan and the compressor stages is referred to as station 2.5, and the pressure signal produced at that point will be indicated as $P_{2.5}$.

The pressure transducer shown as probe 20 and sensor 28 is preferably a high response transducer which will respond to a range of pressure frequencies such as 0 to 1,000 Hz and at least 0 to 100 Hz. The pressure transducer shown as probe 18 and sensor 26 is a low response transducer which responds to low pressure frequencies such as those under 10 Hz. It will be apparent that the two transducers 26 and 28 may be combined into a single transducer which has the desired response over the entire frequency range of interest, with the selected frequencies being provided by means of filters.

The signal from the high response pressure sensor shown as block 28 is fed through a signal conditioning amplifier, not shown, into a band-pass filter 30 and which passes therethrough only the pressure frequencies of interest, approximately between 10 and 250 Hz depending upon the precise fan aerodynamics. The pressure frequencies outside the range of interest are attentuated. The output from the band-pass filter 30, shown as $\Delta P$, is fed to an AC to DC converter 32 which converts the AC output signal from the pressure transducer 28 into a DC signal for subsequent use. The DC output from converter 32, which is proportional to the amplitude of the pressure signals in the frequency range passed through filter 30, is then passed through a gain normalization amplifier, not shown, and fed as one of the two inputs into a comparator 34.

The output from the low response pressure sensor shown as block 26 is also fed through an amplifier, not shown, into a low-pass filter 36 which may also contain a residual balance adjustment. The low-pass filter eliminates all frequency above, for example, 1 Hz, and preferably above one-fourth Hz. The output signal from low-pass filter 36 is essentially DC, and has an amplitude proportional to the absolute steady state pressure in the fan exhaust duct. The output from the low-pass filter 36 is then fed through a gain normalization amplifier, not shown, and then into a function generator 38 in which a reference trigger level signal $\Delta P_T$ is generated as a function of the absolute steady state pressure $P_{2.5}$.

FIG. 2 shows a plot of the variation in the trigger level $\Delta P_T$ as a function of the absolute steady state pressure $P_{2.5}$. The trigger level is shaped to eliminate inaccuracies which result in the operation of the near surge indicator at high altitudes, and under part power conditions. At the low pressures, under 5 psi, the trigger level $\Delta P_T$ is a constant which allows detection of high frequency pressure oscillations without being affected by the inaccuracy of the low frequency pressure sensor. In the mid-range, between approximately 5 and 20 psi, $\Delta P_T$ is set as a constant times $P_{2.5}$ which permits an equivalent $\Delta P_T/P_{2.5}$ to be effected. As illustrated in FIG. 2, the constant shown as representative is 0.4.

At the high pressure regions, typically above 20 psi, where pressure levels are generally beyond those of interest to the near surge indicator but within the levels that must be tolerated by the pressure transducers, $\Delta P_T$ is raised to a high level to avoid inadvertent detection of disturbances such as pressure spikes produced by thrust augmentation equipment typically used in turbofan engines.

The implementation of the curve shown in FIG. 2 within block 38 can be accomplished by well-known electronic circuitry available to those skilled in the art.

The output from function generator 38, $\Delta P_T$ is then fed as a second input to comparator 34. Comparator 34 compares the high response signal $\Delta P$ with the trigger level signal $\Delta P_T$, and if the high frequency signal $\Delta P$ exceeds the trigger level $\Delta P_T$, an output signal is produced from comparator 34. The output signal can be sent to an engine control requesting corrective action to prevent or alleviate surge, or the signal can be used to activate an alarm. Corrective action could include opening bleeds in the engine, opening the gas generator and/or fan bypass nozzles, decreasing fuel flow, or resetting variable fan and/or compressor stators. The alarm could include a light or buzzer, or a flag indicative of a control reset.

The advantage of the use of the trigger level as opposed to the ratio calculation is that operation is possible at low pressure levels where pressure sensors are characteristically inaccurate. Operation can also be inhibited above those pressure levels that are beyond the region of interest. Circuit implementation is simpler than that of the ratio calculation and also more noise free, thus resulting in improved accuracy.

By means of the present invention surge in a turbojet engine may be anticipated at a time much earlier than the prior art devices. By measuring the aerodynamic characteristics of the engine in the fan discharge portion, greater real time warning is available before actual engine surge occurs, thereby allowing more time for corrective action to be taken to avoid surge.

Although the invention has been described in its preferred embodiment for use in the fan discharge flow path of a turbofan engine, it is apparent that the concepts of the invention may be applied to a turbojet engine or to the compressor stage of a turbine engine where the pressure probes would be located in the compressor discharge flow path. The shape of the triggering signal would be modified accordingly, and the frequency range of the band-pass filter would be adjusted to pass those frequencies determined to be representative of the specific engine aerodynamics.

While the invention has been described in terms of electronic circuitry, it will be apparent that mechanical, fluidic or other components may be used, and that other changes may be made in the combination and arrangement of the surge indicator and its method of operation without departing from the scope of the invention as hereinafter claimed.

We claim:

1. An indicator for a turbine engine comprising
   pressure sensing means positioned in a flow path of said engine and producing signals which are a function of the gas pressure oscillations therein,
   a band-pass filter connected to receive said signals and passing therethrough only the high frequency signal components characteristic of engine surge,
   a low-pass filter also connected to receive said signals and passing therethrough only the low frequency signal components indicative of the steady state pressure,
   means for producing from said low frequency signal components a triggering signal,
   and comparator means for comparing said high frequency signal components with said triggering signal and producing an output signal when the amplitude of said high frequency signal components exceeds the amplitudes of said triggering signal.

2. An indicator as in claim 1 in which said pressure sensing means comprises a first high response pressure transducer, and a second low response pressure transducer.

3. An indicator as in claim 2 in which the signals produced by said first transducer are fed to said band-pass filter, and the signals produced by said second transducer are fed to said low-pass filter.

4. An indicator as in claim 1 in which said band-pass filter is tuned to pass therethrough signal components in the approximate range of 10 Hz to 250 Hz.

5. An indicator as in claim 1 in which the low frequency signal components passed through said low-pass filter are below about 1 Hz.

6. An indicator as in claim 1 in which said pressure sensing means is positioned in the fan duct airflow path of a turbofan engine.

7. An indicator as in claim 1 in which said means for producing a triggering signal is a function generator.

8. An indicator as in claim 7 in which said function generator produces a triggering signal which is constant at low amplitudes of said low frequency signal components, which increases linearly with intermediate amplitudes of said low frequency signal components, and which is a high constant value at high amplitudes of said low frequency signal components.

9. A method for determining the imminence of surge in a turbojet engine comprising the steps of
   producing signals indicative of the gas pressure oscillations which occur in a flow path of said engine,
   modifying said gas pressure oscillation signals by removing therefrom the frequency components which are not characteristic of imminent engine surge,
   developing from said gas pressure oscillation signals a steady state pressure signal,
   producing from said steady state pressure signal a triggering signal,
   and comparing said triggering signal with said modified gas pressure oscillation signals.

10. A method as in claim 9 and including the step of generating an output signal indicative of the imminence of surge in said engine when said modified gas pressure oscillation signals exceed said triggering signal.

* * * * *